(12) United States Patent
Billon

(10) Patent No.: US 7,177,233 B2
(45) Date of Patent: Feb. 13, 2007

(54) SYNTHETIC SONAR ANTENNA

(75) Inventor: Didier Billon, Brest (FR)

(73) Assignee: Thales, Neuilly Sur Seine (FR)

( * ) Notice: Subject to any disclaimer, the term of this patent is extended or adjusted under 35 U.S.C. 154(b) by 0 days.

(21) Appl. No.: 10/523,003

(22) PCT Filed: Jul. 9, 2003

(86) PCT No.: PCT/EP03/50297

§ 371 (c)(1),
(2), (4) Date: Feb. 1, 2005

(87) PCT Pub. No.: WO2004/015447

PCT Pub. Date: Feb. 19, 2004

(65) Prior Publication Data

US 2006/0146647 A1      Jul. 6, 2006

(30) Foreign Application Priority Data

Aug. 6, 2002     (FR) .................................. 02 09997

(51) Int. Cl.
*G01S 15/89* (2006.01)

(52) U.S. Cl. ........................................ 367/88; 367/905

(58) Field of Classification Search .................. 367/88, 367/138, 105, 905
See application file for complete search history.

(56) References Cited

U.S. PATENT DOCUMENTS 4,199,746 A * 4/1980 Jones et al. .................... 367/88
4,987,563 A * 1/1991 Gilmour ........................ 367/88

FOREIGN PATENT DOCUMENTS

WO          9918452 A     4/1999

* cited by examiner

*Primary Examiner*—Dan Pihulic
(74) *Attorney, Agent, or Firm*—Lowe Hauptman & Berner, LLP

(57) ABSTRACT

The invention relates to a synthetic sonar antenna and more particularly to the self-calibration of such an antenna. It consists in minimizing the number of sensors of the reception antenna by fixing the reduced pitch between the sensors, imposed by the precision of the self-calibration, solely at the two ends of the antenna. According to a variant, the reduced pitch is fixed at just one end of the antenna. It makes it possible to increase the precision of the self-calibration with a smaller number of sensors than in the prior art.

7 Claims, 1 Drawing Sheet

SYNTHETIC SONAR ANTENNA

CROSS-REFERENCE TO RELATED APPLICATIONS

Figure 1:
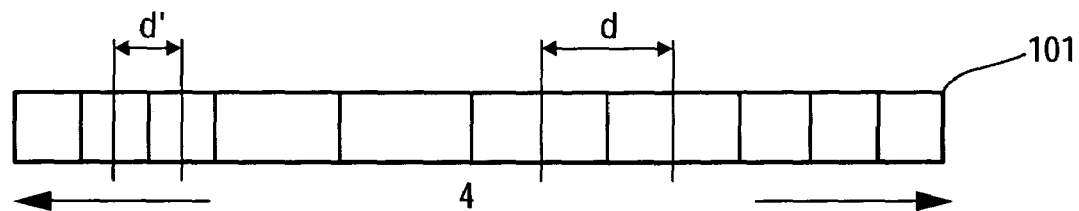

The present Application is based on International Application No. PCT/EP2003/050297, filed on Jul. 9, 2003, which in turn corresponds to FR 02/09997 filed on Aug. 6, 2002, and priority is hereby claimed under 35 USC §119 based on these applications. Each of these applications are hereby incorporated by reference in their entirety into the present application.

Synthetic antennas are well known, both in the field of radar and that of sonar, and the self-calibration of such antennas is a technique known per se, described in particular in an article by Didier Billon and Franck Fohanno published in the proceedings of "OCEAN 98" by IEE on pages 965 to 970.

The self-calibration of a synthetic antenna based on inter-recurrence correlation consists in estimating a length L of a displacement parallel to the antenna, a delay $\tau$ between two correlated signals, and a variation in bearing $\beta$ induced by the rotation of the antenna, from signals of two successive recurrences, received over two time intervals corresponding to one and the same distance interval and small enough for it to be possible to assume that these parameters are constant. The length L is the sum, on the one hand, of the lengths of the components parallel to the antenna of the displacement between the two emission instants and on the other hand, of the displacement between two reception instants relating to the center of the distance interval considered. If O$\xi$ is the antenna axis oriented in the direction of the displacement, the self-calibration is based on the correlation between the signal received at the point with abscissa $\xi$ at the first recurrence and at the point with abscissa $\xi-L$ at the second recurrence.

The precision of the estimates depends in particular on the number of pairs ($\xi,\xi-L$) of abscissas along the antenna such that the incident acoustic field generated by the reverberation of the sea bed has independent values at the abscissas $\xi$ lying between $\xi_1+L$ and $\xi_M$, $\xi_1$ and $\xi_M$ being the abscissas of the phase centers of the extreme sensors of the antenna.

The number of independent values of the acoustic field along the reception antenna is equal to the ratio of the length of the antenna $L_r$ to the correlation length of the field along the antenna, which is equal to the ratio $\lambda/\Delta\theta$ of the wavelength $\lambda$ and of the bearing width $\Delta\theta$ of the emission sector.

In the known art, the pitch between the sensors of the reception antenna must be less than this field correlation length, the ratio between the two lengths having in practice a value of the order of 1.5. Stated otherwise, the number of sensors must be greater than the number of independent values of the incident field along the antenna in the same ratio.

Thus, increasing the number of independent values of the field along the antenna involves, in the known art, reducing the pitch between sensors, hence increasing the number thereof. The invention aims to obtain the same effect with a lesser increase than in the prior art.

The invention proposes, in its preferred embodiment, a synthetic sonar antenna, characterized in that the geometry of the reception antenna is optimized in such a way as to minimize the number of sensors by fixing the pitch imposed by the precision of the self-calibration at at least one end of the reception antenna.

Figure 2:
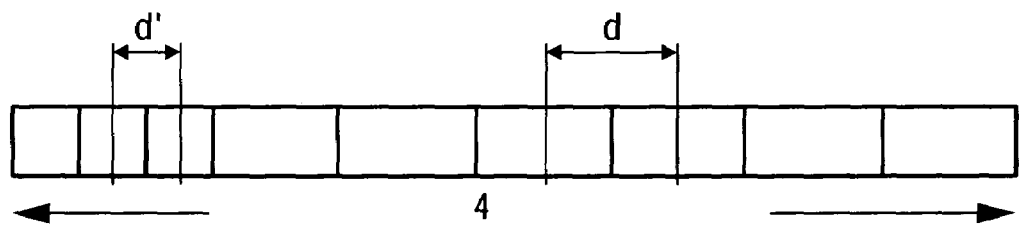

Other features and advantages of the invention will become clearly apparent in the following description, pre-sented by way of nonlimiting example with regard to the appended figures which represent:

FIG. 1, the diagram of the reception antenna according to the preferred embodiment of the invention and, FIG. 2, the diagram of this antenna according to a variant embodiment of the invention.

In the subsequent description, the term "antenna" on its own relates to a reception antenna.

To maximize the degree of temporal coverage of the sonar system, it is necessary for the speed of the platform to be close to the upper limit imposed by the principle of the synthetic antenna. In this case, the length L/2 of the inter-recurrence displacement measured parallel to the antenna is close to the length $L_r$ of the antenna. Thus the ends with which the inter-recurrence correlation is done, of length $L_r-L$, then comprise an insufficient number of sensors to allow satisfactory spatial interpolation.

The invention proposes, as represented in FIG. 1, to reduce the pitch at the two ends of the antenna 101, the remainder of the antenna retaining a pitch which is determined, as in the known art, by the desired level of the image lobe in the directivity pattern of a channel, which in practice leads to fixing a pitch for example of the order of 0.7 $\lambda/\Delta\theta$ denoted d.

According to a variant, the pitch is reduced at just one end.

The reduced pitch being denoted d', let N be the number of sensors with the nominal pitch of d and N' the number of sensors with the reduced pitch d' (see FIG. 1). The total number of sensors is then M=N+N'. In order for it to be possible to determine by interpolation at least one pair of signals (s($\xi$, t), s($\xi-L$, t+T$_r$)) consisting of a signal of a first recurrence and of a signal of a second recurrence whose phase centers are L apart, the parameter of the self-calibration being defined above, it is necessary to satisfy the inequality:

$$L \leq \xi_M - \xi_1 \tag{1}$$

The length of the antenna being fixed and given by the expression $L_r$=Nd+N'd', relation (1) may be written in the equivalent manner:

$$L \leq L_r - d \tag{2}$$

if the pitch is constant therein as in the known art (N'=0), or else, $$L \leq L_r - \frac{d+d'}{2} \tag{2'}$$

if the pitch is reduced at only one of the two ends, or else again, $$L \leq L - d' \tag{2''}$$

if the pitch is reduced at both ends.

Thus, the length $L_r$ being fixed, the limit on L is larger than in the known art if the pitch is reduced at one end, and larger again if the pitch is reduced at both ends. This advantage is acquired provided that at one end with reduced pitch, there is at least one sensor.

When d is much less than $L_r$, the lesser limitation of L, hence of the speed of the platform, constitutes only a small relative advantage with respect to the known art. However, this analysis takes no account of the quality required by the spatial interpolation of the self-calibration of the synthetic antenna.

Depending on the resolution gain desired for the synthetic antenna processing, the pitch d is determined conventionally as a function of criteria of quality of directivity of the channels formed. Now, its value generally turns out to be incompatible with the necessary self-calibration precision.

The method of the invention allows a substantial saving in this case in the number of sensors of the antenna, in a ratio close to that of the pitch d determined conventionally and of the pitch d' fixed by the precision of the self-calibration if the antenna ends carrying the inter-recurrence correlation have a much smaller length than the total length of the antenna. This case may in particular arise when utilizing the self-calibration method described in the patent application published in France under No. 2 769 372. Disclosed therein is a method making it possible to reduce the length of these ends while preserving sufficient self-calibration precision by virtue of the inclusion in the processing of gyrometric measurements.

Condition (1) is valid only if a linear interpolation is sufficient. For example, if $\xi_1 < \xi m - L < \xi_2$, the interpolation is done according to the formula:

$$s(\xi_M L, t+T_r) = \frac{(\xi_2 \xi_M + L)s(\xi_1, t+T_r) + (\xi_M L \xi_1)s(\xi_2, t+T_r)}{\xi_2 \xi_1} \quad (3)$$

This interpolation may turn out to be insufficiently precise in the case of an antenna whose constant pitch d is determined, as in the prior art, independently of the constraint related to the precision of the interpolation in the self-calibration. If K is the order of the interpolation required with such an antenna, K=1 corresponding to a linear interpolation, K=2 corresponding to a parabolic interpolation and so on and so forth, it is then necessary to replace if K>2, condition (2) with the stricter condition $$L \leq L_r(K+1)\frac{d}{2}.$$

The reduced pitch d' may be chosen so that the linear interpolation (3) is sufficient. It then suffices for there to be two sensors with reduced pitch at one of the two ends.

Specifically, instead of interpolating the signals, received at $t+T_r$, of the first two sensors of the second recurrence, to determine the signal with phase center $\xi_M - L$, the signals, received at t, of the last two sensors of the first recurrence are interpolated according to a formula analogous to (3) to determine the signal with phase center $\xi_1 + L$.

Generally, the implementation of the method of the invention does not involve reducing the pitch over the entire length $L_r - L$ of one end of the antenna, the benefit of the reduced pitch with respect to the nominal pitch being real only for the few end sensors, typically for example between 1 and 4, so as to alleviate the loss of precision of the spatial interpolation due to the edge effects.

The invention claimed is:

1. An antenna for a sonar with synthetic antenna processing, comprising:
    a plurality of spaced out sensors distributed in a main zone in which the sensors are spaced out by a pitch d and at least in one zone located at one end of the antenna in which the sensors are spaced out by a pitch d' smaller than pitch d, said pitch d being defined so as to obtain the desired level of the grating lobe in the directivity pattern of a channel and said pitch d' being defined so as to obtain the desired precision for the self-calibration of the antenna, said self-calibration being made by the means of an inter-recurrences correlation.

2. The antenna according to claim 1, in which the pitch d between sensors is reduced to d' at both end zones of the antenna with regard to said main zone.

3. The antenna according to claim 1, in which the pitch d between sensors is reduced to d' at only one end zone of the antenna with regard to said main zone.

4. The antenna according to claim 1, in which the pitch d is defined by the following formula:

$$d \approx 0.7 \cdot \lambda / \Delta \theta$$

in which λ represents the wavelength of the signal and θ the bearing width of the transmission sector.

5. The antenna according to claim 4, in which the pitch d' is determined so that the report d/d' is at least greater than 1.5.

6. The antenna according to claim 5, in which the pitch d between sensors is reduced to d' at both end zones of the antenna with regard to said main zone.

7. The antenna according to claim 5, in which the pitch d between sensors is reduced to d' at only one end zone of the antenna with regard to said main zone.

* * * * *